(12) United States Patent
Rushing et al.

(10) Patent No.: US 11,868,269 B2
(45) Date of Patent: Jan. 9, 2024

(54) TRACKING MEMORY BLOCK ACCESS FREQUENCY IN PROCESSOR-BASED DEVICES

(71) Applicant: Microsoft Technology Licensing, LLC, Redmond, WA (US)

(72) Inventors: Andrew Joseph Rushing, Apex, NC (US); Thomas Philip Speier, Wake Forest, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/487,629

(22) Filed: Sep. 28, 2021

(65) Prior Publication Data

US 2023/0107660 A1  Apr. 6, 2023

(51) Int. Cl.
*G06F 12/00* (2006.01)
*G06F 12/1027* (2016.01)
*G06F 3/06* (2006.01)

(52) U.S. Cl.
CPC ........ *G06F 12/1027* (2013.01); *G06F 3/0622* (2013.01); *G06F 3/0655* (2013.01); *G06F 3/0679* (2013.01); *G06F 2212/684* (2013.01)

(58) Field of Classification Search
CPC .. G06F 12/1027; G06F 3/0622; G06F 3/0655; G06F 3/0679; G06F 2212/684
See application file for complete search history.

(56) References Cited

U.S. PATENT DOCUMENTS

2003/0140207 A1* 7/2003 Nagase .................. G06F 3/061
711/167
2013/0159597 A1* 6/2013 Cheong ............... G06F 12/0638
711/E12.008
2014/0181400 A1* 6/2014 Lin ........................ G06F 3/0608
711/114
2017/0139826 A1  5/2017 Sugimori
2020/0192809 A1  6/2020 Mappouras et al.
2021/0117121 A1* 4/2021 Chen ..................... G06F 3/0647

OTHER PUBLICATIONS

"International Search Report and Written Opinion Issued in PCT Application No. PCT/US22/037967", dated Nov. 4, 2022, 10 Pages. (Ms# 409981-WO-PCT).

* cited by examiner

*Primary Examiner* — Gurtej Bansal
(74) *Attorney, Agent, or Firm* — Withrow & Terranova, PLLC

(57) ABSTRACT

Tracking memory block access frequency in processor-based devices is disclosed herein. In one exemplary embodiment, a processor-based device provides a processing element (PE) that is configured to include an access count table for tracking accesses to memory blocks. The access count table is a packed table that comprises a plurality of access count values, each of which corresponds to a memory block of a plurality of memory blocks. Upon detecting a memory access operation (i.e., data-side operations such as memory load operations, memory store operations, atomic increment operations, set operations, and the like, or instruction-side operations such as code fetch operations) directed to a given memory block, the PE increments an access count value corresponding to the memory block. The access count value then can be accessed (e.g., by a process executing on the PE), and used to determine an access frequency for the memory block.

18 Claims, 7 Drawing Sheets

TRACKING MEMORY BLOCK ACCESS FREQUENCY IN PROCESSOR-BASED DEVICES

FIELD OF THE DISCLOSURE

The technology of the disclosure relates to memory management in processor-based devices, and, more particularly, to determining frequency of memory block accesses.

BACKGROUND

Memory provided by a memory device of a processor-based device may be subdivided into memory blocks. As used herein, the term "memory block" refers to any contiguous range of memory provided by the memory device of the processor-based device. A memory block in some embodiments may align with a memory page, which is a contiguous range of memory associated with an address translation from a virtual memory address (or an intermediate physical memory address) to a physical address within the contiguous range of memory. A memory block according to some embodiments may comprise a strict subset of a memory page, or vice versa.

A processor-based device that employs multiple heterogeneous memory devices of differing latencies or bandwidths may encounter circumstances in which an understanding of which memory blocks are being accessed more or less frequently over time is desirable. For instance, a processor-based device may provide both lower-latency (i.e., having faster memory access time) memory in the form of a Double Data Rate (DDR) Dynamic Random Access Memory (DRAM) memory device with which the processor-based device can natively communicate, as well as higher-latency (i.e., having slower memory access time) memory in the form of a memory device residing behind a media-abstracted or transactional interface such as Compute Express Link (CXL). In one potential use case, a hypervisor executing on such a processor-based device may need to determine whether to dynamically assign guest virtual machine (VM) memory pages to the lower-latency memory or the higher-latency memory based on how frequently the guest VM memory pages are accessed. Similarly, in a use case in which memory is oversubscribed, software may need to identify a subset of far memory that is sufficiently "cold" (i.e., infrequently accessed) to qualify as a candidate to be transferred into swap space in a data store such as a solid state device (SSD).

One conventional approach to determining memory block access frequency uses a software solution that retrieves a value of an access indicator bit from each page table entry (PTE) of a page table used for virtual-to-physical or intermediate-physical-to-physical memory address mapping. However, this approach provides only a coarse indication of access frequency (i.e., accessed or not accessed), which may not provide sufficient granularity unless the access indicator bits are observed over a large window of time. This approach also requires processor hardware, which typically manages coherency at a multi-byte granularity, to read in several multi-byte PTEs to access a few single bits of interest within those PTEs, which wastes bandwidth and processor cycles and may create heavier cache pollution. Another approach adds a hardware-incremented count field in each PTE, which can reduce the burden on software when counting memory block accesses. This approach, though, still results in similar bandwidth consumption and cache pollution issues when accessing a small subset of the contents of each PTE to generally determine access frequency. Still another approach involves hardware-managed caching solutions, such as the use of DDR media that is managed by a host memory controller as one large last-level cache (LLC). This approach is less than ideal because it may result in thrashing of the cache if the hardware-managed caching solution is direct-mapped, as is conventional for DRAM caches.

Accordingly, a more efficient mechanism for tracking memory block access frequency in processor-based devices is desirable.

SUMMARY

Exemplary embodiments disclosed herein track memory block access frequency in processor-based devices. In this regard, in one exemplary embodiment, a processor-based device provides a processing element (PE) that includes an access count table for tracking accesses to memory blocks. The access count table is a packed table that comprises a plurality of access count values, each of which corresponds to a memory block of a plurality of memory blocks. Upon detecting a memory access operation (i.e., a data-side memory access such as a memory load operation, a memory store operation, an atomic increment operation, a set operation, and the like, or an instruction-side memory access such as a code fetch operation) directed to a given memory block, the PE increments an access count value corresponding to the memory block. The access count value then can be accessed by a first process executing on the processor-based device and used to determine an access frequency for the memory block.

To reduce the number of increment operations performed by the PE, some embodiments may increment the access count value only for memory access operations that result in a translation lookaside buffer (TLB) miss and/or a cache miss. In such embodiments, circumstances may arise in which an access count value of zero (0) is ambiguous with respect to the access frequency for the corresponding memory block, in that it could indicate either an "extremely hot" (i.e., extremely frequently accessed) memory block or an "extremely cold" (i.e., extremely infrequently accessed) memory block. This is because translations for memory access operations to an extremely hot memory block may be satisfied using the TLB, which may result in the corresponding access count value for the memory block not being incremented for the extremely hot memory block.

Accordingly, such embodiments provide an access-track table, which is a packed table that comprises a plurality of access-track indicators and a plurality of access-cleared indicators, each corresponding to a memory block of the plurality of memory blocks. The access-track indicator corresponding to a memory block is set when a memory access operation to that memory block occurs and can be cleared at a time that is decoupled from the time that the corresponding page table entry (PTE-accessed indicator is cleared. When the access-track indicator is cleared by a process executing the processor-based device, the corresponding access-cleared indicator is also set by the process. The process may then employ the access-track indicator and the access-cleared indicator to disambiguate an access count value of zero (0) by using the access-track indicator as a disqualifier of an otherwise qualified (when the access-cleared indicator is set) access count value of zero (0) in denoting an extremely cold memory block.

In another exemplary embodiment, a processor-based device is disclosed. The processor-based device comprises a PE that comprises an access count table, which is a packed table that comprises a plurality of access count values that each correspond to a memory block of a plurality of memory blocks. The PE is configured to detect a memory access operation directed to a memory block of the plurality of memory blocks. The PE is further configured to, responsive to detecting the memory access operation, increment an access count value of the plurality of access count values, wherein the access count value corresponds to the memory block.

In another exemplary embodiment, a method for tracking memory block access frequency in processor-based devices is provided. The method comprises detecting, by a PE of a processor-based device, a memory access operation directed to a memory block of a plurality of memory blocks. The method further comprises, responsive to detecting the memory access operation, incrementing an access count value of a plurality of access count values of an access count table, wherein the access count table is a packed table and the access count value corresponds to the memory block.

In another exemplary embodiment, a non-transitory computer-readable medium is disclosed. The computer-readable medium stores thereon computer-executable instructions which, when executed by a processor-based device, cause the processor-based device to detect a memory access operation directed to a memory block of a plurality of memory blocks. The computer-executable instructions further cause the processor-based device to, responsive to detecting the memory access operation, increment an access count value of a plurality of access count values of an access count table, wherein the access count table is a packed table and the access count value corresponds to the memory block.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 1:
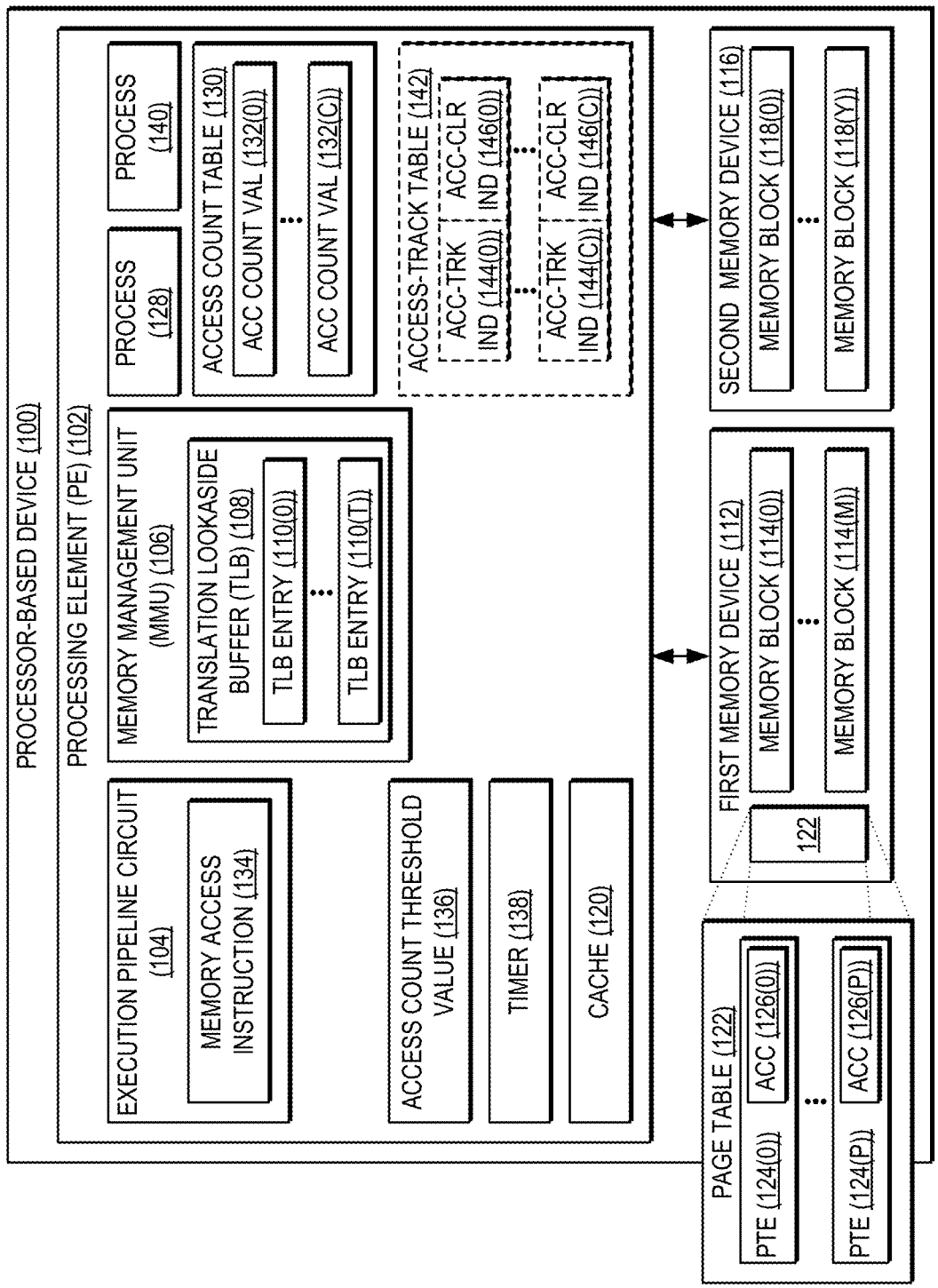
FIG. 1 is a schematic diagram of an exemplary processor-based device that includes a processing element (PE) configured to track memory block access frequency.
Figure 4:
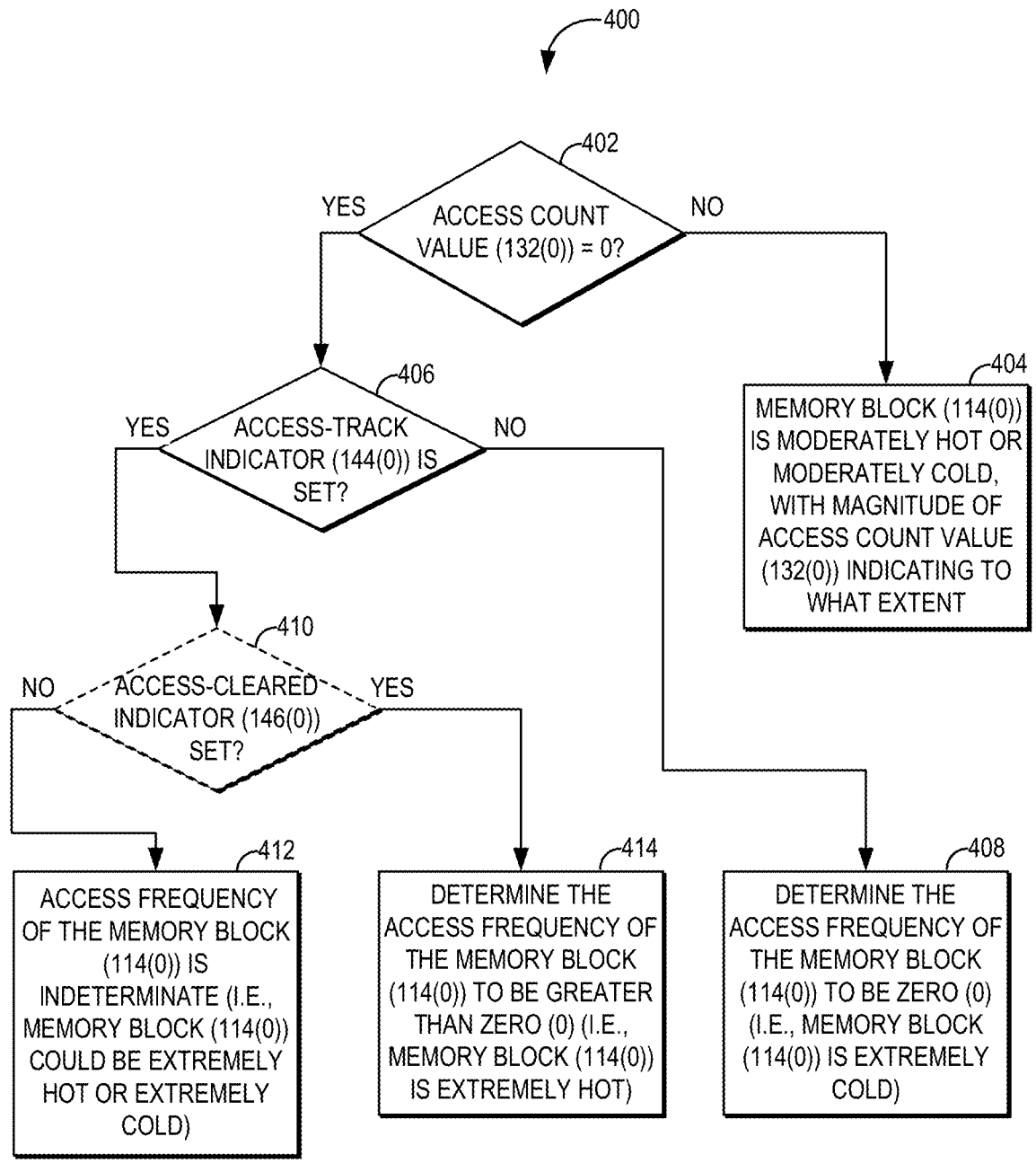
Figure 5:
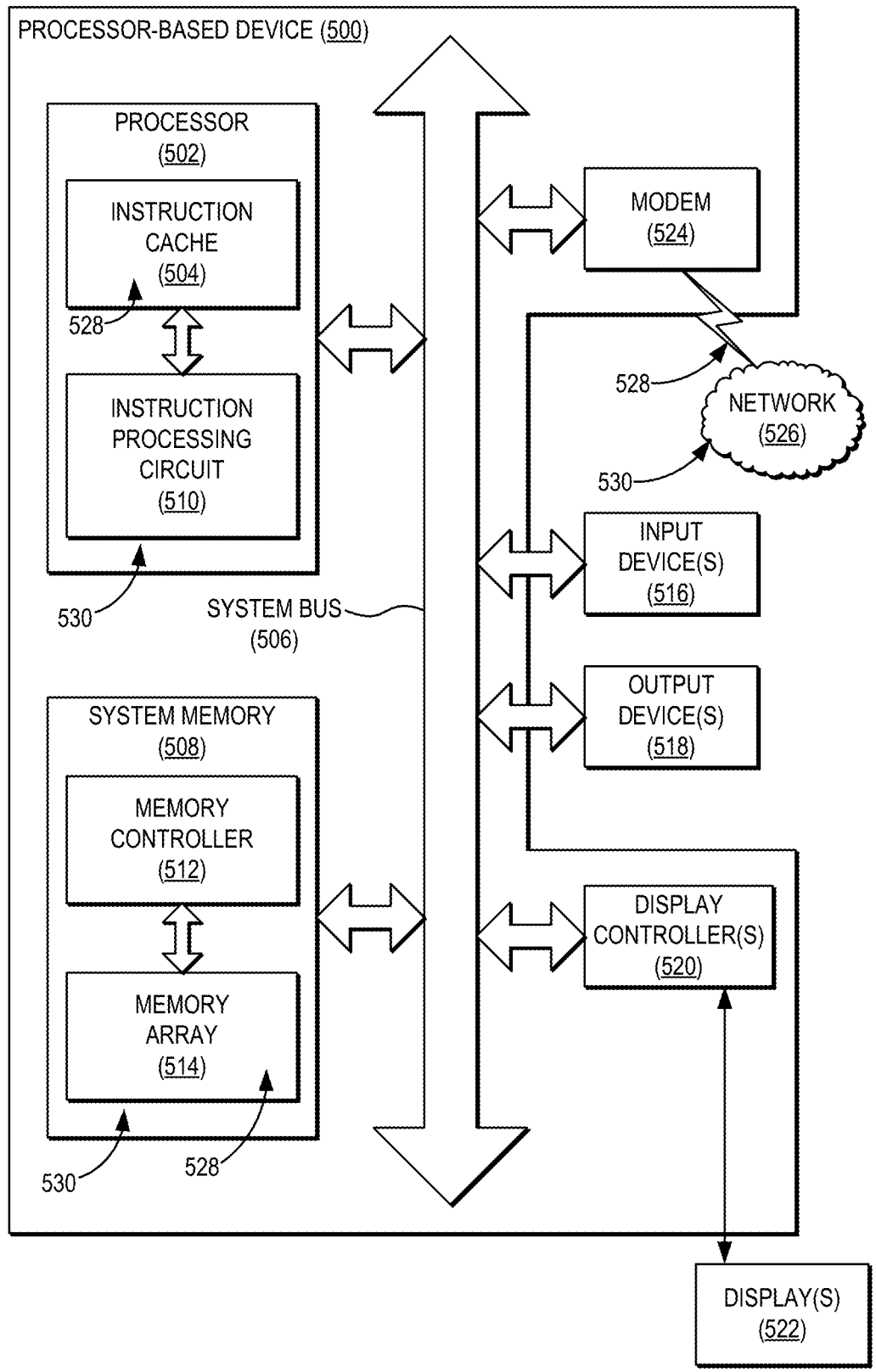

FIG. 4 is a flowchart illustrating exemplary operations for determining access frequency for a memory block based on based on an access count value, an access-track indicator, and an access-cleared indicator, according to some embodiments; and FIG. 5 is a block diagram of an exemplary processor-based device, such as the processor-based device of FIG. 1, that is configured to track memory block access frequency.

DETAILED DESCRIPTION

Exemplary embodiments disclosed herein track memory block access frequency in processor-based devices. In this regard, in one exemplary embodiment, a processor-based device provides a processing element (PE) that includes an access count table for tracking accesses to memory blocks. The access count table is a packed table that comprises a plurality of access count values, each of which corresponds to a memory block of a plurality of memory blocks. Upon detecting a memory access operation (i.e., a data-side memory access such as a memory load operation, a memory store operation, an atomic increment operation, a set operation, and the like, or an instruction-side memory access such as a code fetch operation) directed to a given memory block, the PE increments an access count value corresponding to the memory block. The access count value then can be accessed by a first process executing on the processor-based device and used to determine an access frequency for the memory block.

To reduce the number of increment operations performed by the PE, some embodiments may increment the access count value only for memory access operations that result in a translation lookaside buffer (TLB) miss and/or a cache miss. In such embodiments, circumstances may arise in which an access count value of zero (0) is ambiguous with respect to the access frequency for the corresponding memory block, in that it could indicate either an "extremely hot" (i.e., extremely frequently accessed) memory block or an "extremely cold" (i.e., extremely infrequently accessed) memory block. This is because translations for memory access operations to an extremely hot memory block may be satisfied using the TLB, which may result in the corresponding access count value for the memory block not being incremented for the extremely hot memory block.

Accordingly, such embodiments provide an access-track table, which is a packed table that comprises a plurality of access-track indicators and a plurality of access-cleared indicators, each corresponding to a memory block of the plurality of memory blocks. The access-track indicator corresponding to a memory block is set when a memory access operation to that memory block occurs and can be cleared at a time that is decoupled from the time that the corresponding page table entry (PTE)-accessed indicator is cleared. When the access-track indicator is cleared by a process executing the processor-based device, the corresponding access-cleared indicator is also set by the process. The process may then employ the access-track indicator and the access-cleared indicator to disambiguate an access count value of zero (0) by using the access-track indicator as a disqualifier of an otherwise qualified (when the access-cleared indicator is set) access count value of zero (0) in denoting an extremely cold memory block.

In this regard, FIG. 1 illustrates an exemplary processor-based device 100 that provides a PE 102 for processing executable instructions. The PE 102 may comprise an individual processor core, including a logical execution unit and associated caches and functional units, of a central processing unit (CPU). The PE 102 in the example of FIG. 1 includes an execution pipeline circuit 104 that is configured to execute an instruction stream comprising computer-executable instructions. Although not shown in FIG. 1, the execution pipeline circuit 104 may include, as non-limiting examples, a fetch stage for retrieving instructions for execution, a rename stage for allocating physical register file (PRF) registers from a PRF (not shown), an instruction decode stage for translating fetched instructions into control signals for instruction execution, a dispatch stage for issuing instructions for execution, an execute stage for actually performing instruction execution, and/or a commit stage for irrevocably updating the architectural state of the PE 102 based on the results of instruction execution. It is to be understood that some embodiments of the processor-based device 100 may comprise multiple PEs 102 rather than the single PE 102 shown in the example of FIG. 1, and further that some embodiments of the PE 102 may include fewer or more stages within the execution pipeline circuit 104 than those described above.

The PE 102 of FIG. 1 further comprises a memory management unit (MMU) 106, which provides virtual memory functionality by performing address translation of virtual memory addresses or intermediate physical addresses to physical memory addresses. The MMU 106 includes a TLB 108, which provides TLB entries 110(0)-110(T) for caching recent translations of virtual memory addresses or intermediate physical addresses to physical memory addresses for subsequent reuse. The PE 102 is also communicatively coupled to a first memory device 112 comprising memory that is subdivided into a plurality of memory blocks 114(0)-114(M), as well as a second memory device 116 comprising memory that is subdivided into a plurality of memory blocks 118(0)-118(Y). In the example of FIG. 1, the memory blocks 114(0)-114(M), 118(0)-118(Y) each may comprise a memory page having a size corresponding to a size used for address translation. However, it is to be understood that in some embodiments the total range covered by the memory blocks 114(0)-114(M), 118(0)-118(Y) may be larger or smaller that the size corresponding to the size used for address translation. Some embodiments may provide that the memory blocks 114(0)-114(M), 118(0)-118(Y) may comprise multiple memory blocks that each cover a contiguous range that is discontiguous from that covered by other memory blocks.

In FIG. 1, the first memory device 112 has a latency (i.e., memory access time) that is lower than a latency of the second memory device 116. Thus, as non-limiting examples, the first memory device 112 may comprise a Double Data Rate (DDR) Dynamic Random Access Memory (DRAM) memory device with which the PE 102 can natively communicate, while the second memory device 116 may comprise a Compute Express Link (CXL) memory device. In some embodiments, rather than or in addition to having a lower latency, the first memory device 112 may provide a higher bandwidth than the second memory device 116 (e.g., the first memory device 112 may comprise a High Bandwidth Memory (HBM) device, while the second memory device 116 may comprise a DDR or CXL memory device, as non-limiting examples). It is to be understood that, while FIG. 1 shows the first memory device 112 and the second memory device 116 as integral elements of the processor-based device 100, in some embodiments one or both of the first memory device 112 and the second memory device 116 may comprise memory devices external to the processor-based device 100 and communicatively coupled through an external interface (not shown). The PE 102 also includes one or more caches, such as a cache 120, that comprise memory in which frequently used instructions and/or data may be stored for faster access by the PE 102. The cache 120 may represent one level of a cache hierarchy that may include additional caches (not shown), such as a Level 1 (L1) cache, a Level 2 (L2) cache, and the like.

In the example of FIG. 1, the first memory device 112 stores a page table 122, comprising a plurality of page table entries (captioned as "PTE" in FIG. 1) 124(0)-124(P) that each store a mapping between a virtual memory address (or an intermediate physical address) and a corresponding physical memory address within the first memory device 112 or the second memory device 116. When the PE 102 needs to translate a virtual memory address or intermediate physical address into a physical memory address, the PE 102 accesses the page table 122 to locate a PTE among the PTEs 124(0)-124(P) associated with the virtual memory address or intermediate physical address, and then reads the corresponding physical memory address from the PTE. PTEs among the PTEs 124(0)-124(P) that have been recently accessed may also be cached by the PE 102 in the TLB 108 for subsequent reuse to avoid repeating the translation process. Each PTE of the PTEs 124(0)-124(P) includes a corresponding PTE-accessed indicator (captioned as "ACC" in FIG. 1) 126(0)-126(P), which may comprise a bit indicator that is set by the PE 102 when a memory page corresponding to the PTE is accessed. It is to be understood that the PTEs 124(0)-124(P) may include other indicators and/or data fields not shown in FIG. 1 for the sake of clarity.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, the PE 102 may further include one or more instruction caches, unified caches, memory controllers, interconnect buses, and/or additional memory devices, caches, and/or controller circuits.

In the example of FIG. 1, the PE 102 is executing a process 128, which may comprise an application such as a hypervisor for providing virtualization functionality or an operating system (OS) exception level application, as non-limiting examples. It is to be understood that, in embodiments comprising more than one PE, the process 128 may be executed on any one of the PEs. In the course of execution, the process 128 may need to determine whether a memory block of the plurality of memory blocks 114(0)-114(M), 118(0)-118(Y) should be placed into one of the first memory device 112 and the second memory device 116. For instance, if the process 128 is a hypervisor, the process 128 may need to determine whether to assign a guest virtual machine (VM) memory page to the lower-latency and/or higher-bandwidth first memory device 112 or the higher-latency and/or lower-bandwidth second memory device 116, based on how frequently the guest VM memory page is accessed. This determination may be facilitated by an understanding of how frequently the memory blocks 114(0)-114(M), 118(0)-118(Y) are accessed, so that "hot" (i.e., frequently accessed) memory blocks may be distinguished from "cold" (i.e., infrequently accessed or unaccessed) memory blocks. However, as discussed above, conventional approaches to determining memory block access frequency may not provide sufficient granularity, and/or may incur unacceptable costs in terms of bandwidth and processor consumption and heavier cache pollution.

In this regard, the PE 102 is configured to track memory block access frequency. In an exemplary embodiment, the PE 102 is configured to provide an access count table 130, which is a packed table comprising a plurality of access count values (captioned as "ACC COUNT VAL" in FIG. 1) 132(0)-132(C) that each correspond to a memory block of the memory blocks 114(0)-114(M), 118(0)-118(Y). The term "packed table" and derivatives thereof are used herein to refer to a table data structure in which each bit represents or is part of a data value, as opposed to bits that are unused or whose purpose is to pad data fields to a predetermined length. In some embodiments, each of the access count values 132(0)-132(C) may be four (4) bytes in size, such that 16 of the access count values 132(0)-132(C) may be packed into a conventional 64-byte cache line. In some embodiments, the intermediate physical address or physical address of the memory access operation, relative to the starting intermediate physical address or physical address of the memory range covered by the access count table 130, may be used as an index into the access count table 130.

In exemplary operation, the PE 102 is configured to detect a memory access operation (i.e., a data-side memory access such as a memory load operation, a memory store operation, an atomic increment operation, a set operation, and the like, or an instruction-side memory access such as a code fetch operation) directed to a memory block, such as the memory block 114(0). In embodiments such as FIG. 1 in which the memory access operation is a data-side memory access, the memory access operation may be detected upon execution of a memory access instruction 134 within the execution pipeline circuit 104 of the PE 102. In response to detecting the memory access operation, the PE 102 increments an access count value (e.g., the access count value 132(0)) corresponding to the memory block 114(0).

In this manner, the PE 102 (e.g., by executing the process 128) may determine an access frequency for any given memory block of the memory blocks 114(0)-114(M), 118(0)-118(Y), and may transfer the memory block to one of the first memory device 112 or the second memory device 116 based on the access frequency. For instance, a memory block corresponding to an access count value that exceeds zero (0) or another specified threshold may be considered a "hot" block, and thus may be transferred to the first memory device 112. Conversely, a memory block corresponding to an access count value of zero (0) or that is below the specified threshold may be considered a "cold" block, and may be transferred to the second memory device 116.

In some embodiments, an accounting interval may be triggered by a hardware interrupt or exception event generated by, e.g., one or more of the access count values 132(0)-132(C) reaching an access count threshold value 136, or by expiration of a timer 138. During the accounting interval, the process 128 according to some embodiments may inspect the access count values 132(0)-132(C) to determine access frequencies for memory blocks, and to perform any required transfers (e.g., migration or remapping) of memory blocks (e.g., between "near" (lower-latency and/or higher-bandwidth) memory and "far" (higher-latency and/or lower-bandwidth) memory). The access count values 132(0)-132(C) may be reset to a value of zero (0) by the process 128 in such embodiments during the accounting interval to place them into a state for counting during a next accounting cycle.

Embodiments of the PE 102 that rely only on the access count table 130 to determine access frequency for the memory blocks 114(0)-114(M), 118(0)-118(Y) can accurately distinguish between hot memory blocks and cold memory blocks because the access count values 132(0)-132(C) represent the actual number of memory access operations to the memory blocks 114(0)-114(M), 118(0)-118(Y) during a given accounting interval. However, it may be desirable to reduce the overhead that is incurred by incrementing the access count values 132(0)-132(C) for every memory access operation. Accordingly, some embodiments may increment the access count values 132(0)-132(C) of the access count table 130 only in response to detecting memory access operations that result in a miss in the cache 120 and/or the TLB 108. Such embodiments allow for decoupling the disambiguation of extremely hot and extremely cold memory blocks from the timeframe (in frequency and offset in time) in which the corresponding PTE-accessed indicators 126(0)-126(P) are cleared by the PE 102 (e.g., by executing the process 140, as a non-limiting example). In these embodiments, the PE 102 may provide an access-track table 142, which is a packed table that comprises a plurality of access-track indicators (captioned as "ACC-TRK IND" in FIG. 1) 144(0)-144(C) and, optionally, a plurality of access-cleared indicators (captioned as "ACC-CLR IND" in FIG. 1) 146(0)-146(C). Each of the access-track indicators 144(0)-144(C) and the access-cleared indicators 146(0)-146(C) (if present) corresponds to a memory block of the plurality of memory blocks 114(0)-114(M), 118(0)-118(Y). According to some embodiments, the intermediate physical address or physical address of the memory access operation, relative to the starting intermediate physical or physical address of the memory range covered by the access-track table 142, may be used as an index into the access-track table 142.

The access-track indicators 144(0)-144(C) each may be set by the PE 102 when a memory access operation directed to a corresponding memory block of the plurality of memory blocks 114(0)-114(M) is detected. In some embodiments, the access-track indicators 144(0)-144(C) are cleared during every accounting cycle, in which case there may be no need for the access-cleared indicators 146(0)-146(C) to track the clearing of the access-track indicators 144(0)-144(C) across accounting cycles. In embodiments in which the access-track indicators 144(0)-144(C) may not be cleared during every accounting cycle, the PE 102 in FIG. 1 may execute the process 128, which, upon clearing one of the access-track indicators 144(0)-144(C), also sets a corresponding one of the access-cleared indicators 146(0)-146(C). Each of the access-track indicators 144(0)-144(C) and the access-cleared indicators 146(0)-146(C) may comprise a single bit, according to some embodiments. The access-track table 142 may comprise a standalone data structure as shown in FIG. 1, may be integrated into a same data structure as the access count table 130 as discussed in greater detail below with respect to FIG. 2A, or may be implemented as two separate data structures as discussed in greater detail below with respect to FIG. 2B.

In the example of FIG. 1, the process 128 may use the access-track table 142 in conjunction with the access count table 130 to perform disambiguation between extremely hot and extremely cold memory blocks. In particular, if an access-cleared indicator of the access-cleared indicators 146(0)-146(C) corresponding to a memory block is set (or if the access-track indicators 144(0)-144(C) are always cleared during each accounting cycle, in which case the memory block can be considered to have an access-cleared indicator that represents a logical true value) and the access count value for the memory block is zero (0), the process 128 may then determine whether an access-track indicator of the access-track indicators 144(0)-144(C) corresponding to the memory block is set. If the access-track indicator is not set, the process 128 can conclude that the access-count value of zero (0) indicates an access frequency of zero (0) (i.e., the memory block is extremely cold). If the access-track indicator is set, the process 128 can determine the access frequency for the memory block to be greater than zero (0) (i.e., the memory block is extremely hot). An exemplary logical flow for determining memory block access frequency based on the access count values 132(0)-132(C), the access-track indicators 144(0)-144(C), and the access-cleared indicators 146(0)-146(C) is discussed in greater detail below with respect to FIG. 4.

It is to be understood that some embodiments of the processor-based device 100 of FIG. 1 may provide multiple instances of the access count table 130 and/or the access-track table 142 for use, e.g., in tracking multiple memory address ranges that each comprise a contiguous set of addresses. Such memory address ranges may or may not have overlapping addresses, and the memory block granularity associated with each range may differ across ranges. It is to be further understood that, while FIG. 1 shows the access count table 130 and the access-track table 142 as elements within the PE 102, in some embodiments they may be located within memory of a memory device external to the PE 102, such as the first memory device 112 or the second memory device 116. Additionally, as noted above, FIG. 1 shows the access count table 130 and the access-track table 142 as separate elements. However, some embodiments may provide the access count table 130 and the access-track table 142 may be combined into a single data structure. Likewise, some embodiments may provide that the access-track table 142 is implemented as two separate data structures. According to some embodiments, the PE 102 may provide one or more memory registers (not shown) that each point to one or more base locations in memory where the access count table 130 and/or the access-track table 142 start. In embodiments in which multiple contiguous address ranges are covered by the memory blocks 114(0)-114(M), 118(0)-118(Y), there may be one set of registers per contiguous address range that each point to base location(s), as well as one set of registers per contiguous address range for configuring a starting address for each range, for configuring a contiguous address range size (i.e., number of memory blocks), and for configuring memory block granularity.

Figure 2A:
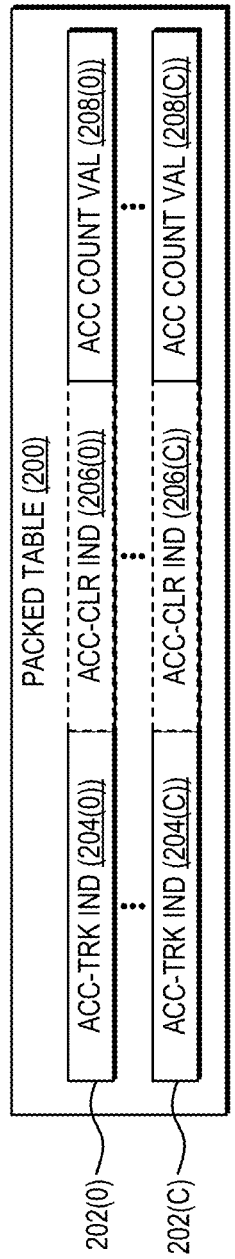
FIGS. 2A and 2B are block diagrams illustrating exemplary implementations of the access count table and the access-track table of FIG. 1, according to some embodiments.
Figure 2B:
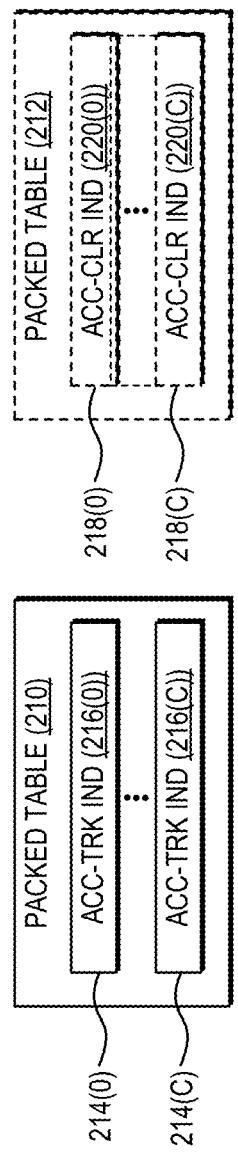

In this regard, FIGS. 2A and 2B illustrate exemplary implementations of the access count table 130 and the access-track table 142 of FIG. 1. In the example of FIG. 2A, a packed table 200 provides functionality corresponding to that of both the access count table 130 and the access-track table 142 of FIG. 1. The packed table 200 comprises a plurality of table entries 202(0)-202(C) that each correspond to a memory block of the plurality of memory blocks 114(0)-114(M), 118(0)-118(Y) of FIG. 1. The table entries 202(0)-202(C) include corresponding access-track indicators (captioned "ACC-TRK IND" in FIG. 2A) 204(0)-204(C), optional access-cleared indicators (captioned "ACC-CLR IND" in FIG. 2A) 206(0)-206(C), and access count values (captioned "ACC COUNT VAL" in FIG. 2A) 208(0)-208(C). The access-track indicators 204(0)-204(C) correspond in functionality to the access-track indicators 144(0)-144(C) of FIG. 1, while the access-cleared indicators 206(0)-206(C) correspond in functionality to the access-cleared indicators 146(0)-146(C) of FIG. 1 and the access count values 208(0)-208(C) correspond in functionality to the access count values 132(0)-132(C) of FIG. 1. In embodiments according to FIG. 2A, the term "access count table" refers to the access count values 208(0)-208(C) of the packed table 200, while the term "access-track table" refers to the access-track indicators 204(0)-204(C) and the access-cleared indicators 206(0)-206(C) of the packed table 200. It is to be understood that, while FIG. 2A shows both the access-track indicators 204(0)-204(C) and the access-cleared indicators 206(0)-206(C) in a single data structure with the access count values 208(0)-208(C), some embodiments may provide that only one of the access-track indicators 204(0)-204(C) and the access-cleared indicators 206 (0)-206(C) is in a single data structure with the access count values 208(0)-208(C) while the other is provided in a separate data structure (not shown). It is to be further understood that, in embodiments in which the access-track indicators 204(0)-204(C) are cleared during every accounting cycle, the access-cleared indicators 206(0)-206(C) may be omitted.

Referring now to FIG. 2B, some embodiments may provide that the access-track table 142 is implemented as up to two separate data structures. Accordingly, FIG. 2B illustrates two packed tables 210 and 212. The packed table 210 comprises a plurality of table entries 214(0)-214(C) that each correspond to a memory block of the plurality of memory blocks 114(0)-114(M), 118(0)-118(Y) of FIG. 1. The table entries 214(0)-214(C) include corresponding access-track indicators (captioned "ACC-TRK IND" in FIG. 2B) 216(0)-216(C) that correspond in functionality to the access-track indicators 144(0)-144(C) of FIG. 1. Similarly, the optional packed table 212 comprises a plurality of table entries 218(0)-218(C) that each correspond to a memory block of the plurality of memory blocks 114(0)-114(M), 118(0)-118(Y) of FIG. 1. The table entries 218(0)-218(C) include corresponding access-cleared indicators (captioned "ACC-CLR IND" in FIG. 2B) 220(0)-220(C) that correspond in functionality to the access-cleared indicators 146 (0)-146(C) of FIG. 1. In embodiments according to FIG. 2B, the term "access-track table" refers collectively to the access-track indicators 216(0)-216(C) of the packed table 210 as well as the access-cleared indicators 220(0)-220(C) of the packed table 212. It is to be further understood that, in embodiments in which the access-track indicators 214 (0)-214(C) are cleared during every accounting cycle, the packed table 212 may be omitted.

Figure 3A:
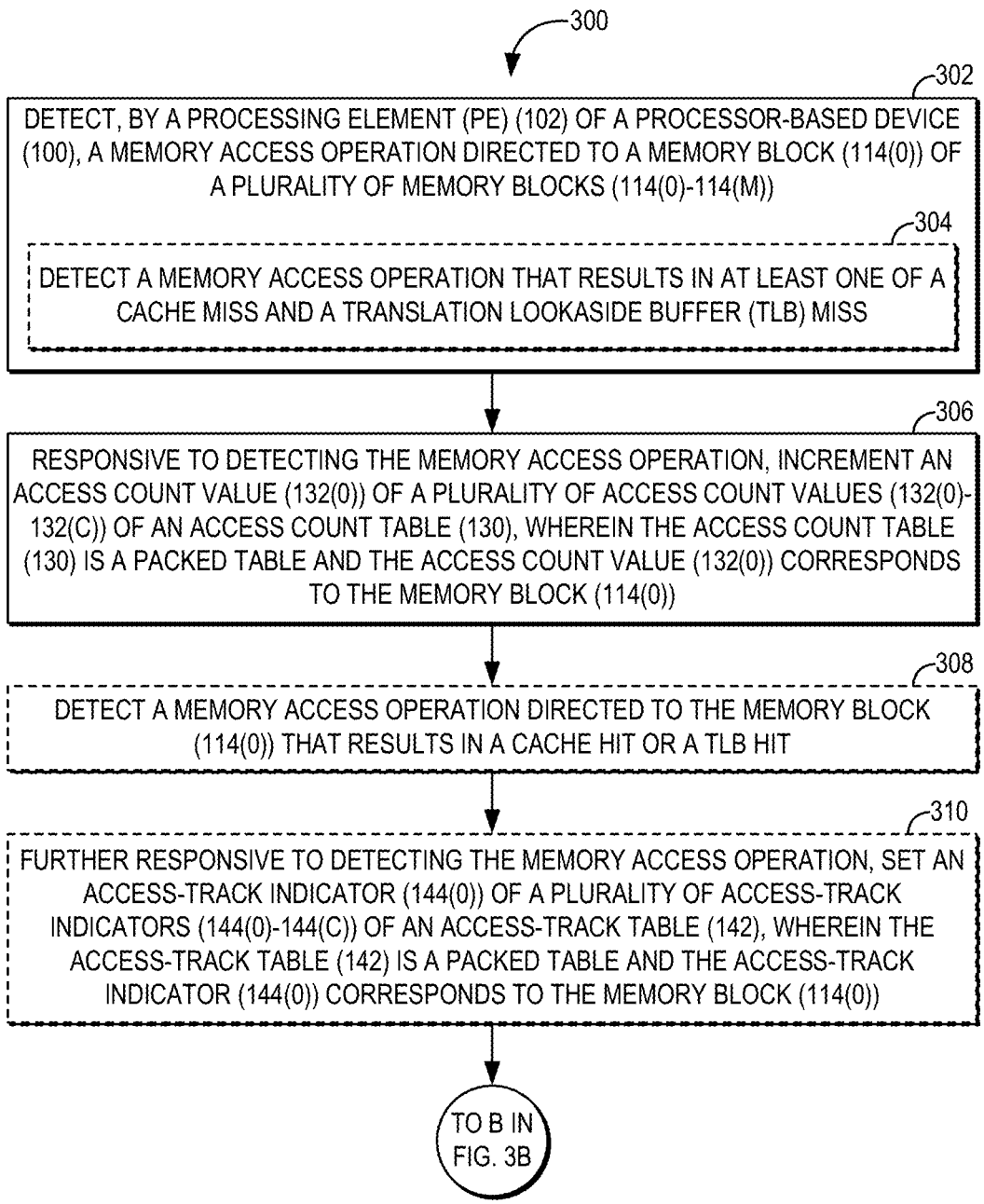
FIGS. 3A-3C are flowcharts illustrating exemplary operations for tracking memory block access frequency, according to some embodiments.
Figure 3B:
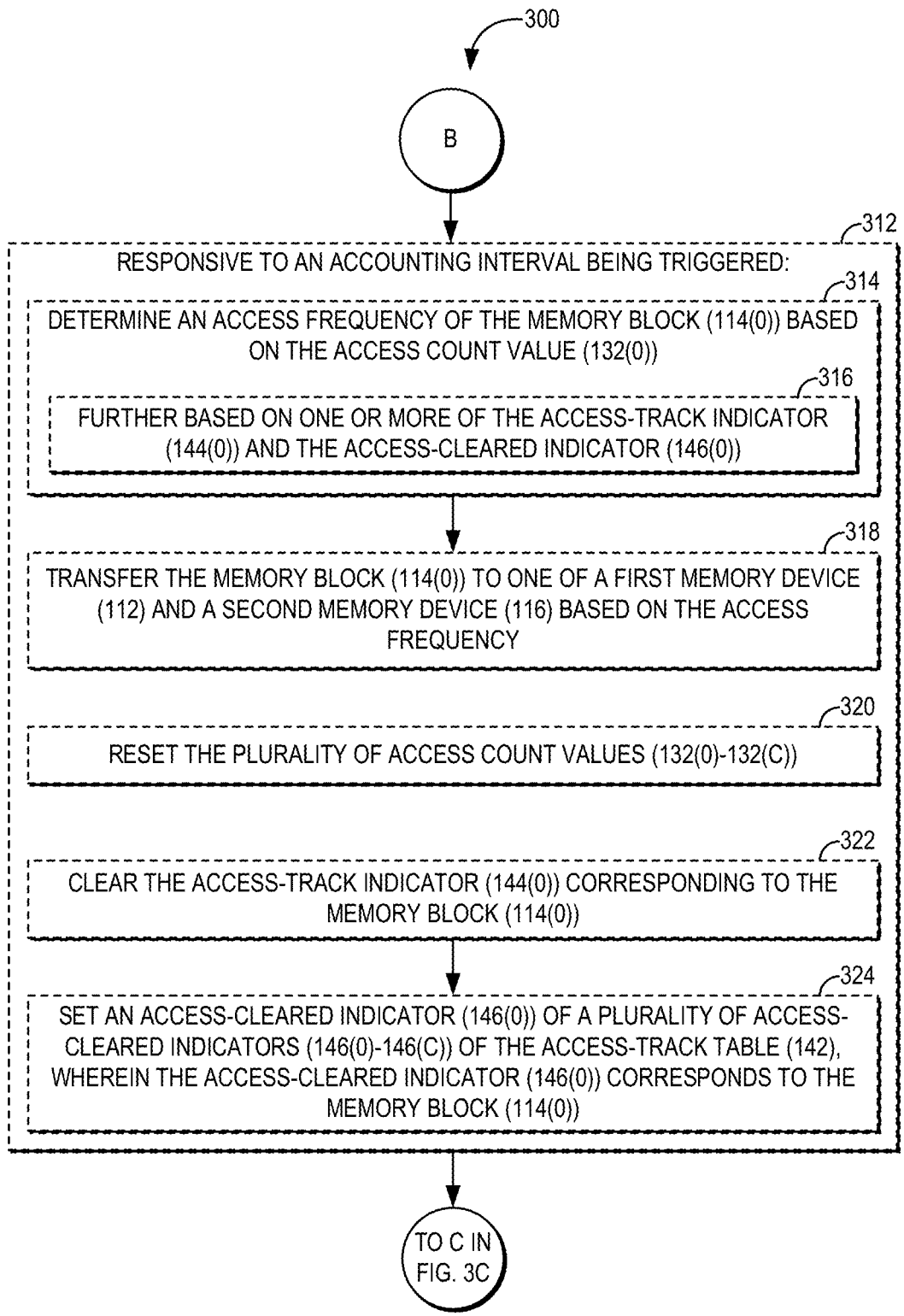
Figure 3C:
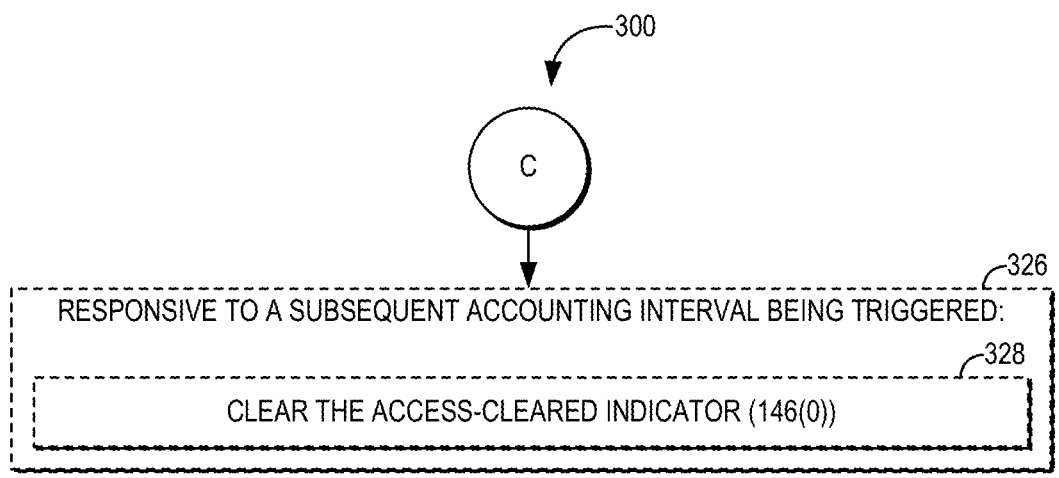

FIGS. 3A-3C provide a flowchart 300 illustrating exemplary operations for tracking memory block access frequency by the PE 102 of FIG. 1 according to some embodiments. For the sake of clarity, elements of FIG. 1 are referenced in describing FIGS. 3A-3C. It is to be understood that some operations illustrated in FIGS. 3A-3C may occur in an order other than that illustrated in FIGS. 3A-3C in some embodiments, and/or may be omitted in some embodiments. In FIG. 3A, operations according to some embodiments begin with the PE 102 detecting a memory access operation directed to a memory block (e.g., the memory block 114(0) of the plurality of memory blocks 114(0)-114 (M) of FIG. 1) (block 302). Some embodiments (e.g., embodiments that employ the access-track table 142 of FIG. 1) may provide that the operations of block 302 for detecting the memory access operation may comprise the PE 102 detecting a memory access operation that results in at least one of a cache miss and a TLB miss (block 304). In response to detecting the memory access operation, the PE 102 increments an access count value, such as the access count value 132(0) of the plurality of access count values 132(0)-132(C) of the access count table 130 of FIG. 1, wherein the access count table 130 is a packed table and the access count value 132(0) corresponds to the memory block 114(0) (block 306).

In some embodiments comprising the access-track table 142, the PE 102 may detect another memory access operation directed to the memory block 114(0) that results in a cache hit or a TLB hit (block 308). In response, the PE 102 may set an access-track indicator such as the access-track indicator 144(0) of the plurality of access-track indicators 144(0)-144(C) of the access-track table 142 of FIG. 1, wherein the access-track table 142 is a packed table and the access-track indicator 144(0) corresponds to the memory block 114(0) (block 310). Operations in some such embodiments may then continue at block 312 of FIG. 3B.

Turning now to FIG. 3B, some embodiments may perform a series of operations responsive to an accounting interval being triggered (e.g., by a hardware interrupt or exception event generated by one or more of the access count values 132(0)-132(C) reaching the access count threshold value 136 or by expiration of the timer 138) (block 312). In some embodiments, the PE 102 (e.g., by executing the process 128, also referred to herein as the "first process 128") may determine an access frequency of the memory block 114(0) based on the access count value 132(0) (block 314). Embodiments that employ the access-track table 142 of FIG. 1 may provide that the operations of block 314 for determining the access frequency of the memory block 114(0) may be further based on one or more of the access-track indicator 144(0) and the access-cleared indicator 146(0) (block 316). The PE 102 (e.g., by executing the first process 128) may then transfer the memory block 114(0) to one of the first memory device 112 and the second memory device 116 based on the access frequency (block 318). For instance, if the access frequency indicates that the memory block 114(0) is hot, the PE 102 may transfer the memory block 114(0) to the first memory device 112, if the memory block 114(0) is not already resident in the first memory device 112.

Some embodiments may further provide that the PE 102 performs additional operations during the accounting interval. In some embodiments, the PE 102 (e.g., by executing the first process 128) may reset the plurality of access count values 132(0)-132(C) (block 320). The PE 102 (e.g., by executing the first process 128) according to some embodiments (e.g., those that employ the access-track table 142 of FIG. 1) may clear the access-track indicator 144(0) corresponding to the memory block 114(0) (block 322). After clearing the access-track indicator 144(0), The PE 102 (e.g., by executing the first process 128) sets an access-cleared indicator, such as the access-cleared indicator 146(0) of the plurality of access-cleared indicators 146(0)-146(C) of the access-track table 142, wherein the access-cleared indicator 146(0) corresponds to the memory block 114(0) (block 324). Note that in embodiments in which the access-track indicator 144(0) is always cleared during an accounting interval, the operations of block 324 for clearing the access-cleared indicator 146(0) may be omitted. Operations in some embodiments may continue at block 326 of FIG. 3C.

Referring now to FIG. 3C, some embodiments may perform further operations responsive to a subsequent accounting interval being triggered (i.e., an accounting interval occurring at a time following the accounting interval referenced in block 312 of FIG. 3B) (block 326). Some embodiments, such as those that employ the access-track table 142 of FIG. 1, may provide that the PE 102 (e.g., by executing a process such as the process 128) clears the access-cleared indicator 146(0) (block 328). Note that in embodiments in which the access-track indicator 144(0) is always cleared during an accounting interval, the operations of block 324 for clearing the access-cleared indicator 146(0) may be omitted.

The PE 102 according to some embodiments provides the access-track table 142 of FIG. 1 to provide disambiguation between extremely hot and extremely cold memory blocks within a timeframe that is decoupled from a timeframe in which one or more of the PTE-accessed indicators 126(0)-126(P) are cleared by the PE 102 (e.g., by executing the process 140, as a non-limiting example). FIG. 4 thus provides a flowchart 400 to illustrate an exemplary logical flow that may be employed, e.g., by the process 128 in such embodiments. Operations begin with the process 128 first determining whether an access count value for the memory block (e.g., the access count value 132(0) corresponding to the memory block 114(0) of FIG. 1) equals zero (0) (block 402). If not, the process 128 can conclude that the memory block 114(0) is either moderately hot or moderately cold, with the magnitude of the access count value 132(0) indicating to what extent (block 404).

However, if the process 128 determines at decision block 402 that the access count value 132(0) equals zero (0), the process 128 next determines whether an access-track indicator corresponding to the memory block 114(0), such as the access-track indicator 144(0) of FIG. 1, is set (block 406). If not, the process 128 can determine that the access frequency of the memory block 114(0) to be zero (0) (i.e., the memory block 114(0) is an extremely cold memory block) (block 408). If the access-track indicator 144(0) is determined at decision block 406 to be set, the process 128 then determines whether an access-cleared indicator corresponding to the memory block 114(0), such as the access-cleared indicator 146(0) of FIG. 1, is set (block 410). If not, the access frequency of the memory block 114(0) is indeterminate, in that the memory block 114(0) could either be an extremely hot memory block or an extremely cold memory block (block 412). Conversely, if the process 128 determines at decision block 410 that the access-cleared indicator 146(0) is set, the process 128 can determine that the access frequency of the memory block 114(0) to be greater than zero (0) (i.e., the memory block 114(0) is an extremely hot memory block) (block 414). Note that in embodiments in which the access-track indicator 144(0) is always cleared during an accounting interval, the operations of decision block 410 may be omitted, and operations may proceed directly from block 406 to block 414.

FIG. 5 is a block diagram of an exemplary processor-based device 500, such as the processor-based device 100 of FIG. 1, that tracks memory block access frequency. The processor-based device 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 500 includes a processor 502. The processor 502 represents one or more general-purpose processing circuits, such as a microprocessor, central processing unit, or the like, and may correspond to the PE 102 of FIG. 1. The processor 502 is configured to execute processing logic in instructions for performing the operations and steps discussed herein. In this example, the processor 502 includes an instruction cache 504 for temporary, fast access memory storage of instructions and an instruction processing circuit 510. Fetched or prefetched instructions from a memory, such as from a system memory 508 over a system bus 506, are stored in the instruction cache 504. The instruction processing circuit 510 is configured to process instructions fetched into the instruction cache 504 and process the instructions for execution.

The processor 502 and the system memory 508 are coupled to the system bus 506 and can intercouple peripheral devices included in the processor-based device 500. As is well known, the processor 502 communicates with these other devices by exchanging address, control, and data information over the system bus 506. For example, the processor 502 can communicate bus transaction requests to a memory controller 512 in the system memory 508 as an example of a peripheral device. Although not illustrated in FIG. 5, multiple system buses 506 could be provided, wherein each system bus constitutes a different fabric. In this example, the memory controller 512 is configured to provide memory access requests to a memory array 514 in the system memory 508. The memory array 514 is comprised of an array of storage bit cells for storing data. The system memory 508 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 506. As illustrated in FIG. 5, these devices can include the system memory 508, one or more input devices 516, one or more output devices 518, a modem 524, and one or more display controllers 520, as examples. The input device(s) 516 can include any type of input device, including, but not limited to, input keys, switches, voice processors, etc. The output device(s) 518 can include any type of output device, including, but not limited to, audio, video, other visual indicators, etc. The modem 524 can be any device configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The modem 524 can be configured to support any type of communications protocol desired. The processor 502 may also be configured to access the display controller(s) 520 over the system bus 506 to control information sent to one or more displays 522. The display(s) 522 can include any type of display, including, but not limited to, a cathode ray tube (CRT), a liquid crystal display (LCD), a plasma display, etc.

The processor-based device 500 in FIG. 5 may include a set of instructions 528 to be executed by the processor 502 for any application desired according to the instructions. The instructions 528 may be stored in the system memory 508, processor 502, and/or instruction cache 504 as examples of non-transitory computer-readable medium 530. The instructions 528 may also reside, completely or at least partially, within the system memory 508 and/or within the processor 502 during their execution. The instructions 528 may further be transmitted or received over the network 526 via the modem 524, such that the network 526 includes the computer-readable medium 530.

While the computer-readable medium 530 is shown in an exemplary embodiment to be a single medium, the term "computer-readable medium" should be taken to include a single medium or multiple media (e.g., a centralized or distributed database, and/or associated caches and servers) that store the one or more sets of instructions 528. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the processor-based devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
a processing element (PE), comprising:
an access count table, wherein the access count table is a packed table comprising a plurality of access count values that each correspond to a memory block of a plurality of memory blocks; and
an access-track table, wherein the access-track table is a packed table comprising a plurality of access-track indicators each corresponding to a memory block of the plurality of memory blocks;
the PE is configured to:
detect a memory access operation directed to a memory block of the plurality of memory blocks that results in at least one of a cache miss and a translation lookaside buffer (TLB) miss; and
responsive to detecting the memory access operation, increment an access count value of the plurality of access count values, wherein the access count value corresponds to the memory block;
detect a memory access operation directed to the memory block that results in a cache hit or a TLB hit; and
responsive to detecting the memory access operation to the memory block that results in the cache hit or the TLB hit, set an access-track indicator corresponding to the memory block; and
responsive to an accounting interval being triggered, clear the access-track indicator corresponding to the memory block.

2. The processor-based device of claim 1, further comprising a first memory device and a second memory device;
wherein the processor-based device is configured to, responsive to the accounting interval being triggered:
determine an access frequency of the memory block based on the access count value; and
transfer the memory block to one of the first memory device and the second memory device based on the access frequency.

3. The processor-based device of claim 1, wherein:
the access-track table further comprises a plurality of access-cleared indicators each corresponding to a memory block of the plurality of memory blocks; and
the processor-based device is further configured to, responsive to the accounting interval being triggered, set an access-cleared indicator corresponding to the memory block.

4. The processor-based device of claim 1, wherein:
the access-track table further comprises a plurality of access-cleared indicators each corresponding to a memory block of the plurality of memory blocks; and
the processor-based device is further configured to, responsive to a subsequent accounting interval being triggered, clear an access-cleared indicator corresponding to the memory block.

5. The processor-based device of claim 1, wherein the processor-based device is further configured to, responsive to the accounting interval being triggered, reset the plurality of access count values.

6. The processor-based device of claim 1, further comprising a first memory device and a second memory device;
wherein the processor-based device is further configured to, responsive to the accounting interval being triggered:
determine an access frequency of the memory block based on the access count value and one or more of the access-track indicator and an access-cleared indicator; and
transfer the memory block to one of the first memory device and the second memory device based on the access frequency.

7. The processor-based device of claim 6, wherein the processor-based device is configured to determine the access frequency of the memory block based on the access count value and one or more of the access-track indicator and the access-cleared indicator by being configured to:
  determine that the access count value equals zero (0);
  determine that the access-track indicator is not set; and
  determine the access frequency of the memory block to be zero (0), based on the access count value and the access-track indicator.

8. The processor-based device of claim 6, wherein the processor-based device is configured to determine the access frequency of the memory block based on the access count value and one or more of the access-track indicator and the access-cleared indicator by being configured to:
  determine that the access count value equals zero (0);
  determine that the access-track indicator is set;
  determine that the access-cleared indicator is set; and
  determine the access frequency of the memory block to be greater than zero (0), based on the access count value, the access-track indicator, and the access-cleared indicator.

9. A method, comprising:
  detecting, by a processing element (PE) of a processor-based device, a memory access operation directed to a memory block of a plurality of memory blocks that results in at least one of a cache miss and a TLB miss;
  responsive to detecting the memory access operation, incrementing an access count value of a plurality of access count values of an access count table, wherein the access count table is a packed table and the access count value corresponds to the memory block
  detecting a memory access operation directed to the memory block that results in a cache hit or a translation lookaside buffer (TLB) hit;
  responsive to detecting the memory access operation to the memory block that results in the cache hit or the TLB hit, setting an access-track indicator of a plurality of access-track indicators of an access-track table, wherein the access-track table is a packed table and the access-track indicator corresponds to the memory block; and
  responsive to an accounting interval being triggered, clearing the access-track indicator corresponding to the memory block.

10. The method of claim 9, further comprising, responsive to the accounting interval being triggered:
  determining an access frequency of the memory block based on the access count value; and
  transferring the memory block to one of a first memory device and a second memory device based on the access frequency.

11. The method of claim 9, further comprising, responsive to the accounting interval being triggered, setting an access-cleared indicator of a plurality of access-cleared indicators of the access-track table, wherein the access-cleared indicator corresponds to the memory block.

12. The method of claim 9, further comprising, responsive to a subsequent accounting interval being triggered, clearing an access-cleared indicator of a plurality of access-cleared indicators of the access-track table, wherein the access-cleared indicator corresponds to the memory block.

13. The method of claim 9, further comprising, responsive to the accounting interval being triggered, resetting the plurality of access count values.

14. The method of claim 9, further comprising, responsive to the accounting interval being triggered:
  determining an access frequency of the memory block based on the access count value and one or more of the access-track indicator and an access-cleared indicator; and
  transferring the memory block to one of a first memory device and a second memory device based on the access frequency.

15. The method of claim 14, wherein determining the access frequency of the memory block based on the access count value and one or more of the access-track indicator and the access-cleared indicator comprises:
  determining that the access count value equals zero (0);
  determining that the access-track indicator is not set; and
  determining the access frequency of the memory block to be zero (0), based on the access count value the access-track indicator.

16. The method of claim 14, wherein determining the access frequency of the memory block based on the access count value and one or more of the access-track indicator and the access-cleared indicator comprises:
  determining that the access count value equals zero (0);
  determining that the access-track indicator is set;
  determining that the access-cleared indicator is set; and
  determining the access frequency of the memory block to be greater than zero (0), based on the access count value, the access-track indicator, and the access-cleared indicator.

17. A non-transitory computer-readable medium, having stored thereon computer-executable instructions that, when executed by a processor-based device, cause the processor-based device to:
  detect a memory access operation directed to a memory block of a plurality of memory blocks that results in at least one of a cache miss and a TLB miss; and
  responsive to detecting the memory access operation, increment an access count value of a plurality of access count values of an access count table, wherein the access count table is a packed table and the access count value corresponds to the memory block
  detect a memory access operation directed to the memory block that results in a cache hit or a translation lookaside buffer (TLB) hit;
  responsive to detecting the memory access operation to the memory block that results in the cache hit or the TLB hit, set an access-track indicator of a plurality of access-track indicators of an access-track table, wherein the access-track table is a packed table and the access-track indicator corresponds to the memory block; and
  responsive to an accounting interval being triggered, clear the access-track indicator corresponding to the memory block.

18. The non-transitory computer-readable medium of claim 17, wherein the computer-executable instructions further cause the processor-based device to, responsive to the accounting interval being triggered:
  determine an access frequency of the memory block based on the access count value; and
  transfer the memory block to one of a first memory device and a second memory device based on the access frequency.

* * * * *